United States Patent [19]

Kobori et al.

[11] Patent Number: 5,450,213
[45] Date of Patent: Sep. 12, 1995

[54] FACSIMILE MACHINE CAPABLE OF PRINTING PLURALITY OF ORIGINAL IMAGES IN MAIN SCANNING DIRECTION OF RECORDING PAPER

[75] Inventors: Kiyoshi Kobori; Takashi Takenaka, both of Higashihiroshima, Japan

[73] Assignee: Sharp Kabushiki Kaisha, Osaka, Japan

[21] Appl. No.: 949,137

[22] Filed: Sep. 23, 1992

[30] Foreign Application Priority Data

Sep. 26, 1991 [JP] Japan ................. 3-247473

[51] Int. Cl.⁶ ............ H04N 1/387; H04N 1/40; H04N 1/00
[52] U.S. Cl. .................. 358/450; 358/448; 358/474
[58] Field of Search ........... 358/450, 451, 287, 257, 358/283, 287, 285, 293, 474, 453, 468, 44, 41, 43, 75, 300, 450, 296, 401, 449, 452, 457; 364/518; 382/9

[56] References Cited

U.S. PATENT DOCUMENTS

| 4,342,052 | 7/1982 | Rackley et al. | |
| 4,536,802 | 8/1985 | Kurata | 358/287 |
| 4,698,778 | 10/1987 | Ito et al. | 358/283 X |
| 4,803,561 | 2/1989 | Kubota | 358/285 |
| 4,954,913 | 9/1990 | Kajita | 358/474 |
| 5,051,843 | 9/1991 | Hayashi | |
| 5,055,921 | 10/1991 | Usui | 358/44 |
| 5,099,336 | 3/1992 | Moriya | 358/300 |
| 5,144,452 | 9/1992 | Abuyama | 358/296 |
| 5,146,343 | 9/1992 | Fujii | 358/296 |
| 5,146,352 | 9/1992 | Nannichi | 358/451 |
| 5,191,429 | 3/1993 | Rourke | 358/296 |
| 5,191,440 | 3/1993 | Levine | 358/450 |
| 5,204,946 | 4/1993 | Shimamura | 395/146 |
| 5,231,516 | 7/1993 | Kamon et al. | 358/449 |
| 5,243,441 | 9/1993 | Kawata | 358/451 |

FOREIGN PATENT DOCUMENTS 3166863 7/1991 Japan.
219464 12/1989 United Kingdom.

*Primary Examiner*—Paul Ip
*Attorney, Agent, or Firm*—Birch, Stewart, Kolasch & Birch

[57] ABSTRACT

Compressed image data for a plurality of sheets of original transmitted from another party is demodulated, expanded by a modem 1 and a facsimile control portion 2, and reduced at a reduction processing portion 11, and the image data after the reduction is transferred to a printing control portion 8. In a first embodiment, the reduced image data for one sheet of original is printed out by a printing portion on a sheet of recording paper from its one end in a main scanning direction. After printing of the image data for the one sheet is completed, the sheet of recording paper is rewound, and then the reduced image data for the second page is printed out laterally to the main scanning direction of the image data of the first page.

9 Claims, 12 Drawing Sheets

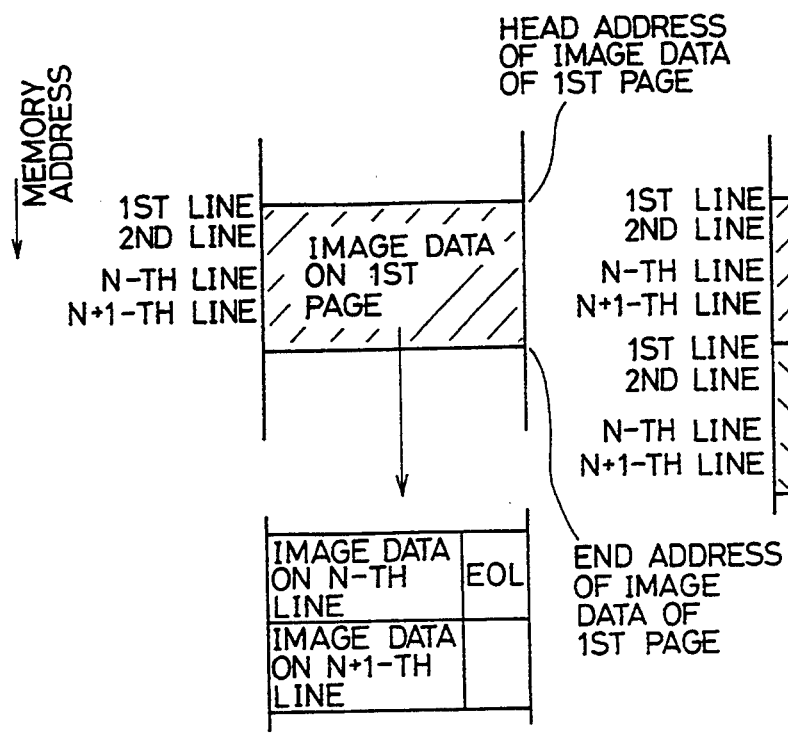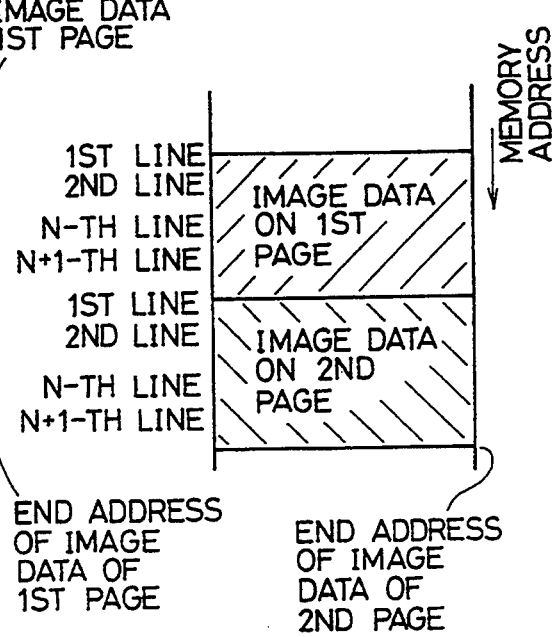
FIG.9(a)  FIG.9(b)
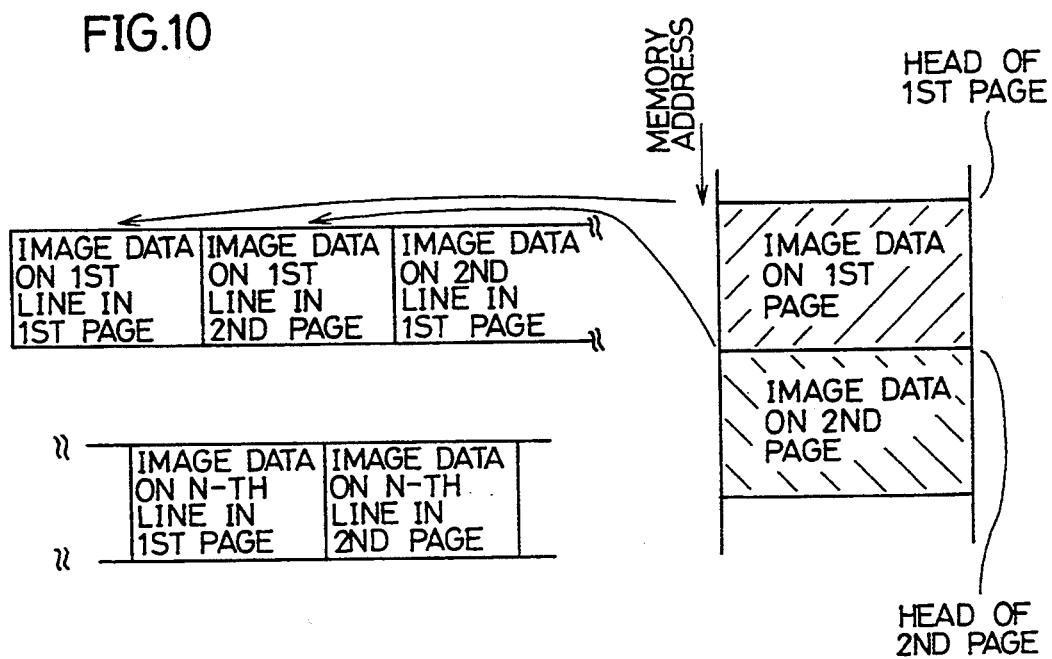
FIG.10

5,450,213

FACSIMILE MACHINE CAPABLE OF PRINTING PLURALITY OF ORIGINAL IMAGES IN MAIN SCANNING DIRECTION OF RECORDING PAPER

BACKGROUND OF THE INVENTION

1. Field of the Invention

The present invention relates generally to facsimile machines, and more specifically, to a facsimile machine receiving image data for a plurality of sheets of paper.

2. Description of the Background Art

Generally, between facsimile machines, when a transmission side transmits an original sheet of B4 size, a receiving side prints out the data on a sheet of recording paper of B4 size, while when the transmission side transmits an original sheet of A4 size, the receiving side prints out the data on a sheet of recording paper of A4 size. In other words, the received data is printed out onto recording paper of the same size as the original from the transmission side, and when image data for a plurality of sheets is received, as shown in FIG. 14, the pieces of image data for the respective pages are sequentially printed out onto sheets of recording paper in a sub scanning direction.

A conventional facsimile machine requires recording paper for one page per one original sheet, storage of received data must be conducted with a large number of recording paper sheets, which is disadvantageous in terms of storing, and uneconomical consuming so much recording paper.

SUMMARY OF THE INVENTION

It is an object of the invention to allow received data to be stored compactly in a small volume in a facsimile machine.

Another object of the invention is to improve economical feature in a facsimile machine.

Yet another object of the invention is to reduce consumption of recording paper in a facsimile machine.

In order to achieve the above-stated objects, a facsimile machine in accordance with the invention includes a modem for receiving image data corresponding to a plurality of original sheets, a key selection portion for instructing printing in a reduction print mode, a reduction processing portion for reducing the size of received image data in response to the instruction output of the key selection portion, a printer for printing out image data on a sheet of recording paper fed in a first direction on a one-by-one line basis in a second direction intersecting the first direction, and a controller for controlling the printer to print out images corresponding to at least two original sheets among the plurality of original sheets side by side in the second direction on the sheet of recording paper.

According to thus structured facsimile machine, image data corresponding to at least two original sheets are printed out side by side in the second direction on the sheet of recording paper, the received data can compactly be stored in a reduced volume and recording paper can more economically be consumed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 9(a) and 9(b) are illustrations; of how data is stored in a storage portion in accordance with the second embodiment of the invention;

FIG. 10 is an illustration of how data stored in the storage portion shown in FIG. 9 is read out;

DESCRIPTION OF THE PREFERRED EMBODIMENTS

Embodiments of the invention illustrated in FIGS. 1 to 13 will be described in detail.

First Embodiment

Figure 1:
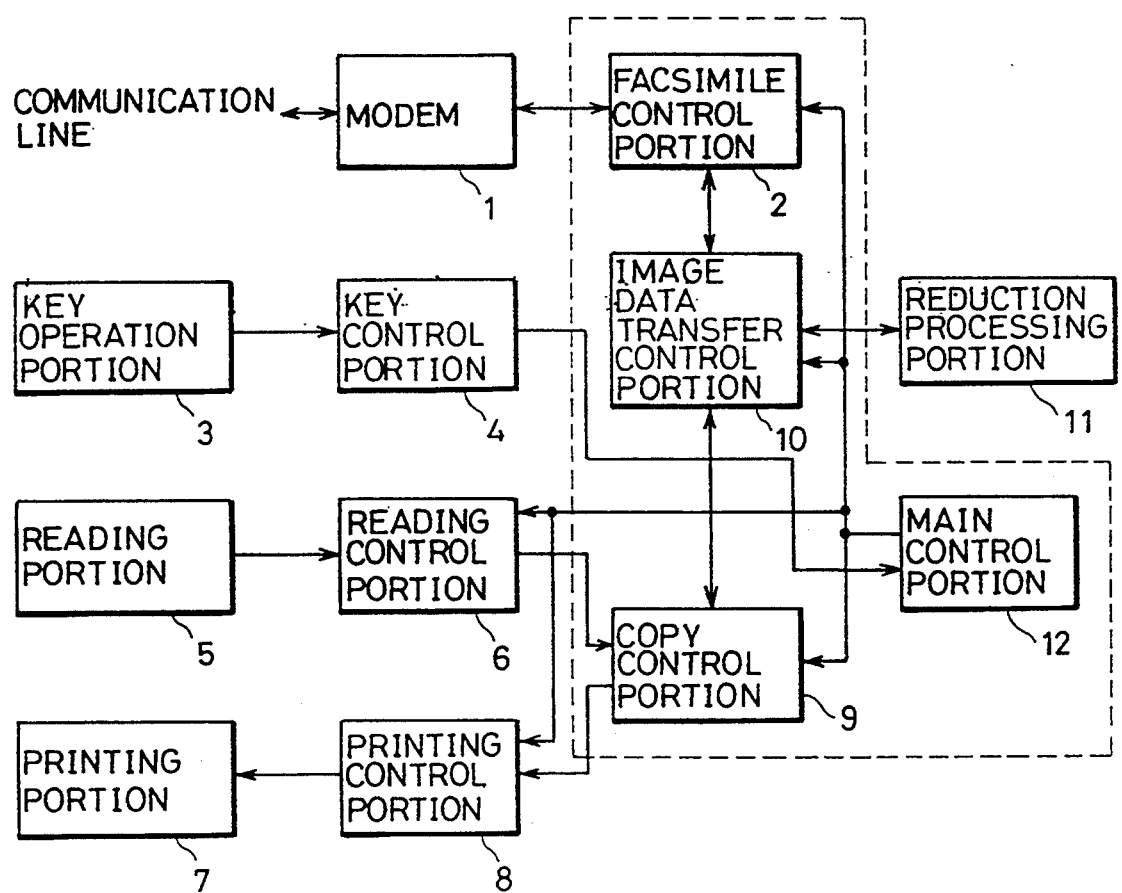
FIG. 1 is a system block diagram showing a structure of a facsimile machine in accordance with a first embodiment of the invention.

FIG. 1 is a block diagram showing a first embodiment of a facsimile machine in accordance with the invention, and a facsimile machine without a function of storing image data is illustrated in this embodiment.

In FIG. 1, a modem 1 demodulates an analog modulated signal from a telephone line into digital image data, and modulates digital image data into an analog signal for transmission. A facsimile control portion 2 conducts communication control of facsimile by the use of modem 1, and compression and expansion of image data. A key operation portion 3 has various keys for operating the facsimile machine. The key operation portion 3 includes a reduction print key which is means for selecting a reduction print mode.

A key control portion 4 controls the key operation portion 3. A reading portion 5 electrically reads the content of an original in copying or in transmission, and includes a paper feeding mechanism for the original. A reading control portion 6 controls the reading portion 5. A printing portion 7, which includes a paper feeding mechanism for recording paper, prints out image data on a recording paper sheet. A printing control portion 8 controls the printing portion 7. The above-stated paper feeding mechanism includes not only a function of feeding recording paper but also a rewinding recording paper. The printing portion 7 (including the paper feeding mechanism), the printing control portion 8 together with a copy control portion 9 and an image data transfer control portion 10 (which will be later described) constitute printing means for printing reduced image data on a sheet of recording paper.

The copy control portion 9 controls the reading control portion 6 and the printing control portion 8. The image data transfer control portion 10 transfers image data to various portions. A reduction processing portion (reduction means) 11 reduces image data. The reduction processing portion 11 can reduce image data at a reduction ratio of $\frac{1}{2}$, $\frac{1}{3}$ or $\frac{1}{4}$. Selection of a reduction ratio is made at the key operation portion 3. A main control portion 12 controls the respective portions of the facsimile machine based on a predetermined program. The facsimile machine control portion 3, the copy control portion 9, the image data transfer control portion 10, the main control portion 12 or the like is formed of, for example, a microcomputer.

Now, a description of an operation in the above embodiment follows.

Figure 3:
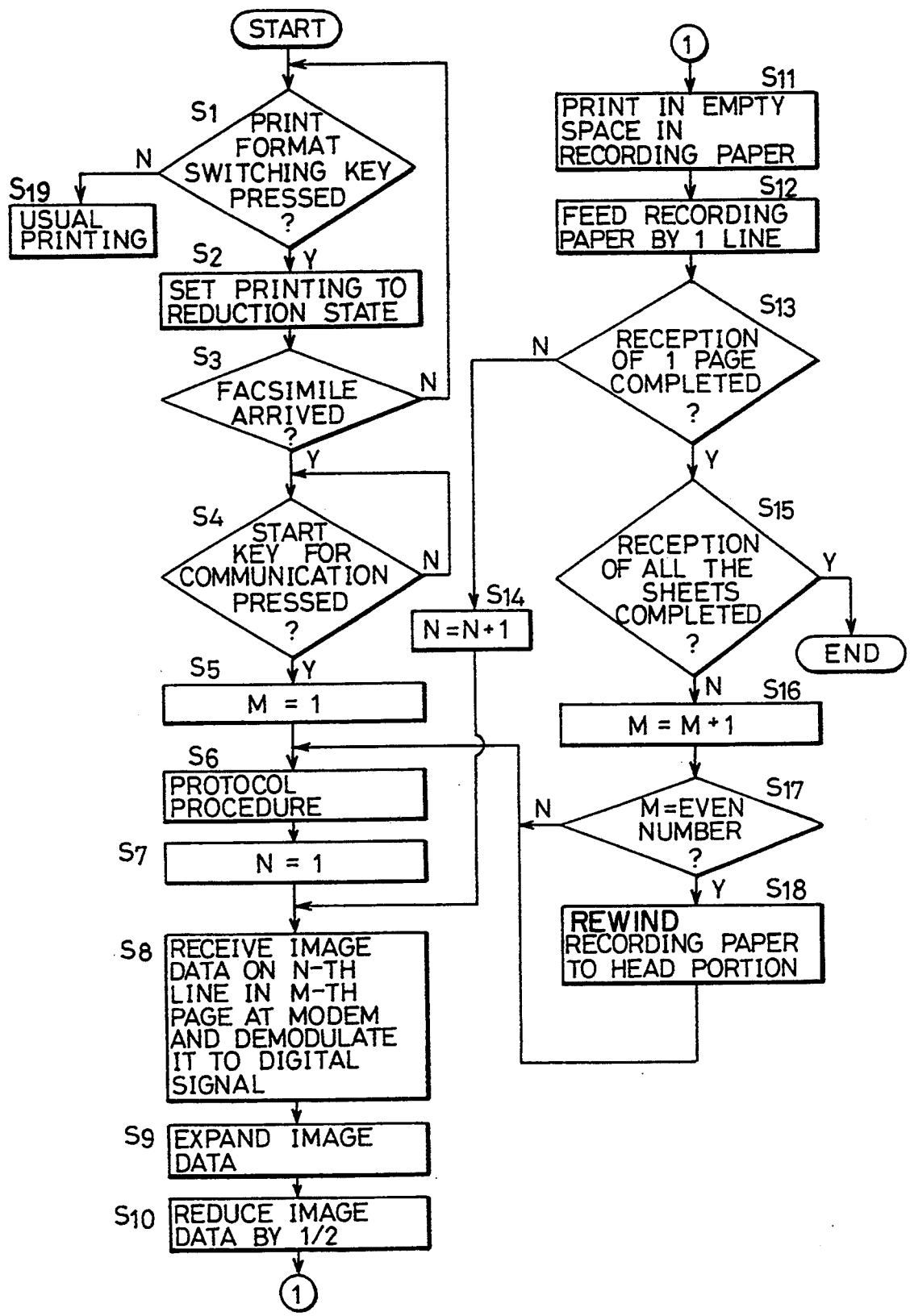
FIG. 3 is a flow chart showing the content of control conducted by a main control portion shown in FIG. 1.

(1) First, an operation at the time of facsimile reception will be described in accordance with the flow chart of FIG. 3 by illustrating reception of two original sheets of B4 size as an example.

The print format is switched by operating the reduction printing key of the key operation portion 3 thereby selecting a reduction ratio of $\frac{1}{2}$ (S1). The content of the key is taken into the main control portion 12 through the key control portion 4, and the main control portion 12 sets a reduction print mode (S2).

In this state, upon a reception of data from another party, a prescribed key of the key operation portion 3 is operated for conducting facsimile communication (S3, S4). Then, the content of the key is taken into the main control portion 12 through the key control portion 4, and the flow proceeds to a protocol procedure for initiating facsimile communication (S5, S6, S7).

After the protocol procedure is completed, when compressed image data having an analog signal for one line of the first page of an original is transmitted from the other party, the data is received at the modem 1, and demodulated from the image data of the analog signal into image data of a digital signal (S8).

Then, the compressed image data is expanded by the facsimile control portion 2 and returned to the original image data. The image data returned to the original is transferred to the reduction processing portion 11 by the image data transfer control portion 10 and reduced by $\frac{1}{2}$ (S9, S10).

The image data after the reduction is transferred to the printing control portion 8 through the copy control portion 9 by the image data transfer control portion 10, and the image data for the first line in the first page is printed out from the left end of sheet of recording paper. Then the sheet of recording paper is fed by the amount of 1 line (S11, S12).

Figures 2A, 2B:
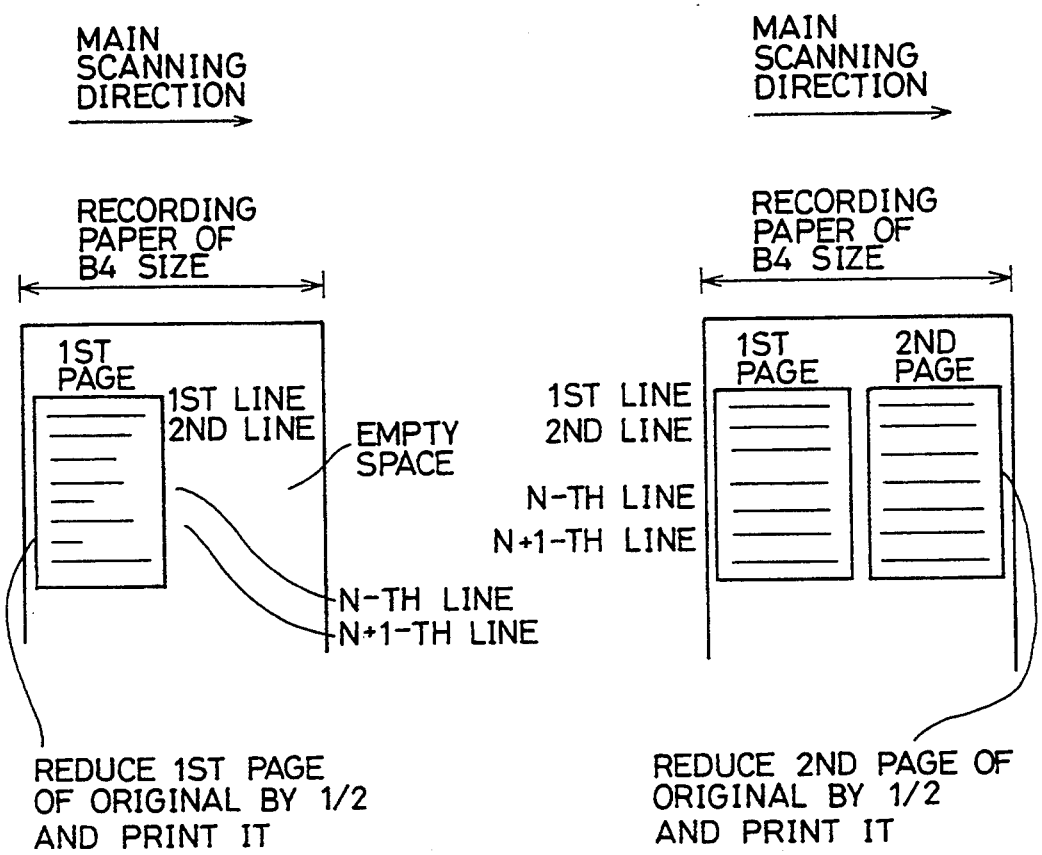
FIGS. 2(a) and 2(b) are views showing how data is printed out on recording paper by the facsimile machine shown in FIG. 1.

By repeating the operation from S8 to S14 until reception of the first page is completed, the image data on the first page is printed out on the sheet of recording paper as illustrated in FIG. 2(a).

In S13, when completion of the reception of the first page is detected, a protocol procedure before receiving the second page is conducted with the other party in S6, during which the printing control portion 8 causes the paper feeding mechanism to make a rewinding operation, and rewind the sheet of recording paper as far as to the position where the first line of the first page was printed out (S15–S18).

After the protocol procedure is completed, when image data on the second page comes in from the other party, the image data on the second page is printed out on the remaining empty space in the right half of the sheet of the recording paper shown in FIG. 2(a) in the same procedure as with the first page, and the state after the reception of the second page is illustrated in FIG. 2(b). More specifically, the image data for the two original sheets are sequentially printed out in a main scanning direction on the sheet of recording paper.

(2) An operation in copying will be described by illustrating reduction-copying two sheets of original of B4 size by $\frac{1}{2}$ as an example.

Prior to copying, the reduction printing key of the key operation portion 3 is operated to select a reduction ratio of $\frac{1}{2}$ and the print format is switched. The content of the key is taken into the main control portion 12 through the key control portion 4, and the main control portion 12 sets a reduction print mode.

Then, when a copy key is operated at the key operation portion 3, the content of the key is taken into the main control portion 12 through the key control portion 4, and the main control portion 12 sets a copy mode, controlling the respective portions based on a program for copying, and a copying operation is executed as follows.

The reading control portion 6 operates the paper feeding mechanism of the reading portion 5, thereby feeding an original to a reading position so as to read the first line of the first page of the original, the image is read by the reading portion 5, and the read image is taken and converted into image data. The image data is transferred to the reduction processing portion 11 through the copy control portion 9 by the function of the image data transfer control portion 10, and reduced by $\frac{1}{2}$ therein. The image data after the reduction is transferred to the printing control portion 8 through the copy control portion 9 by the function of the image data transfer control portion 10, and the printing control portion 8 causes the printing portion 7 to print out the image data for the 1 line from the left end of a sheet of recording paper. The sheet of recording paper is fed to a printing position for the next 1 line.

Thereafter, the second line of the original is read out in the same procedure as described above, and the read image data is reduced by $\frac{1}{2}$ for printing. Then, reading, reducing and printing operations of the Nth line, the N+1 line, and so on are repeated until the end of the first page of the original. When printing of the image for one page is completed, as shown in FIG. 2(a), the first page of the original has been reduced and printed out in the left half of the recording paper of B4 size.

After the reading and printing of the first page of the original, the printing control portion 8 causes a rewinding operation of the paper feeding mechanism, and rewinds the sheet of recording paper to the head position of the printing of the first page. Thereafter, reading of the first line of the second page of the original is initiated, printing is conducted in the same procedure as with the first page, and the printing of the second page is conducted in the remaining right half of the sheet of recording paper shown in FIG. 2(a). More specifically, the two sheets of original are printed out side by side in a main scanning direction on the sheet of recording paper as shown in FIG. 2(b).

Figure 4A:
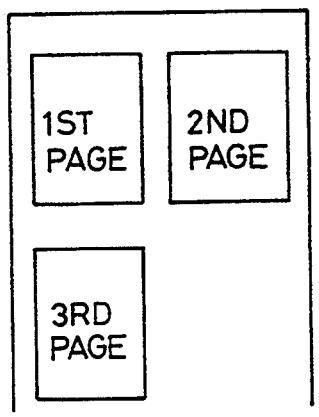
FIGS. 4(a) and 4(b) are representations showing one example of print format by the facsimile machine shown in FIG. 1.
Figure 4B:
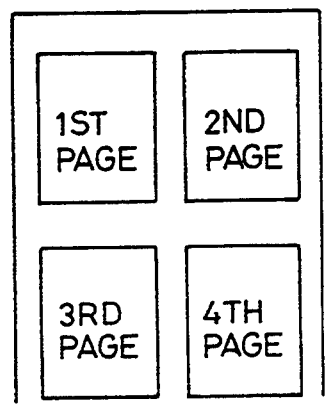

The case of the two sheets of original of B4 size has been described, and in the case of three sheets of original, printing is conducted to recording paper as shown in FIG. 4(a), while printing is conducted onto a sheet of recording paper as shown in FIG. 4(b) in the case of four sheets of original.

Figure 5A:
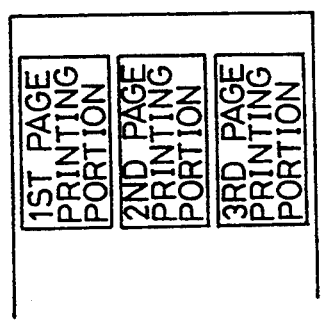
FIGS. 5(a) and 5(b) are representations showing another print format by the facsimile machine shown in FIG. 1.
Figure 5B:
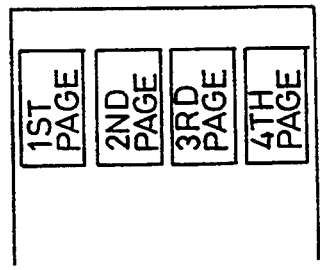

Although the case in which the original of B4 size is reduced by $\frac{1}{2}$ has been described, the original of B4 size can also be reduced by $\frac{1}{3}$ and $\frac{1}{4}$ for printing by selecting a reduction ratio. For instance, when three sheets of original of B4 size are printed out at a reduction ratio of $\frac{1}{3}$, image data for the three sheets are printed out side by side in its main scanning direction on a sheet of recording paper of B4 size as shown in FIG. 5(a), while when an original sheet of B4 size is reduced by $\frac{1}{4}$ to be printed out, image data for four sheets will be printed out side by side in its scanning direction on a sheet of recording paper of B4 size as shown in FIG. 5(b). More specifically, the printing means decides the number of original sheets to be printed out side by side in the main scanning direction depending upon selection of a reduction ratio.

As described above, in a facsimile machine without a function of storing image data, image data for a plurality of sheets of original can be printed out side by side in the main scanning direction on a sheet of recording paper, so that data can compactly be kept in a reduced volume and the amount of recording paper used can be reduced.

Second Embodiment

Figure 6:
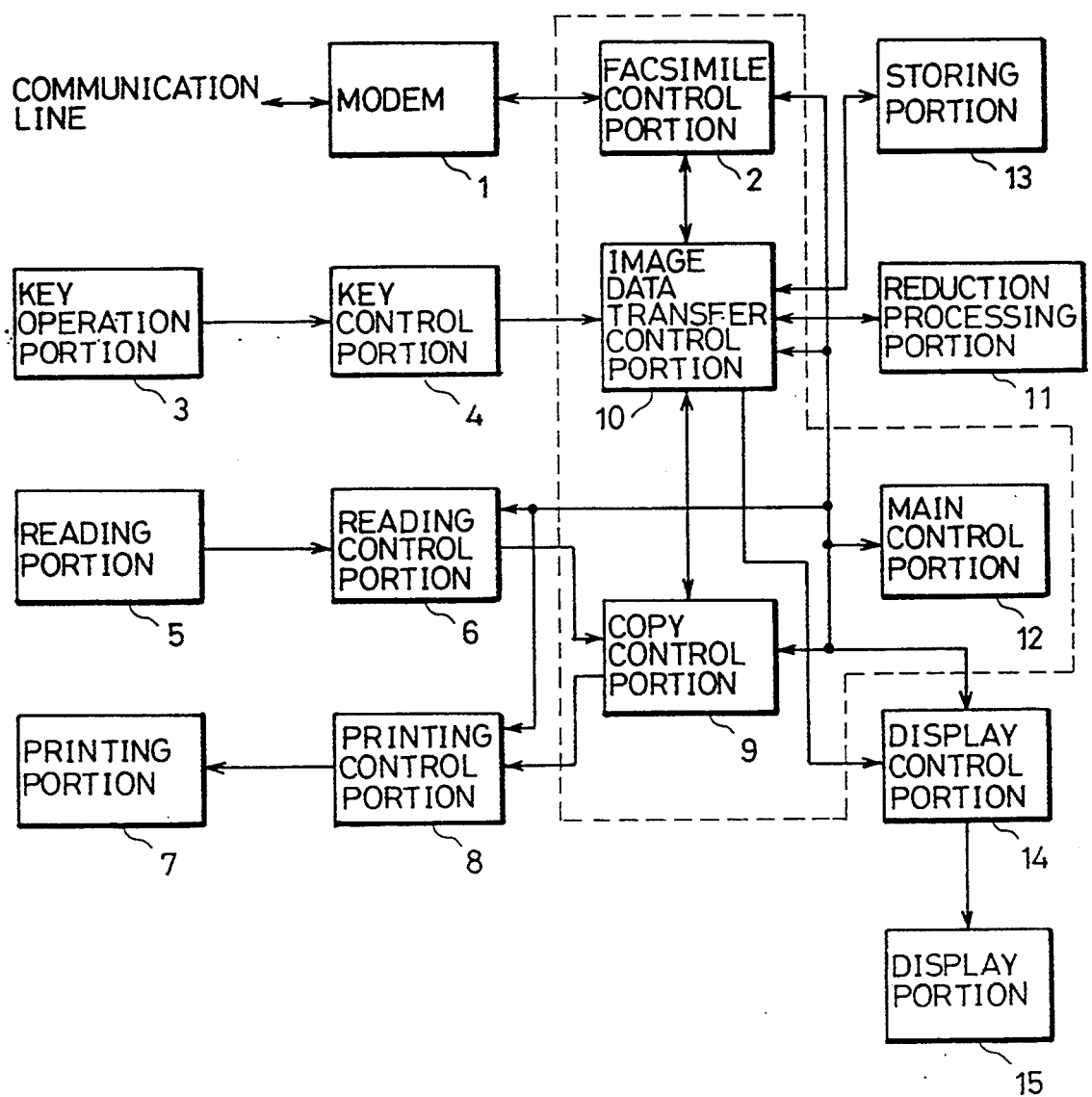
FIG. 6 is a system block diagram showing a construction of a facsimile machine in accordance with second and third embodiments of the invention.

FIG. 6 is a block diagram showing a facsimile machine in accordance with a second embodiment of the invention which includes image data storing means. In FIG. 6, the same reference characters are provided to portions the same as in the first embodiment shown in FIG. 1, and the description thereof will not repeated.

A storing portion (storing means) 13 is provided for storing reduced image data and is formed of what can store and keep data such as a semiconductor memory, a cassette tape, or floppy disk. A display portion 15 is controlled by a display control portion 14, and displays the state of each set function of the facsimile machine or image data. A description of an operation of the second embodiment follows.

Figure 7:
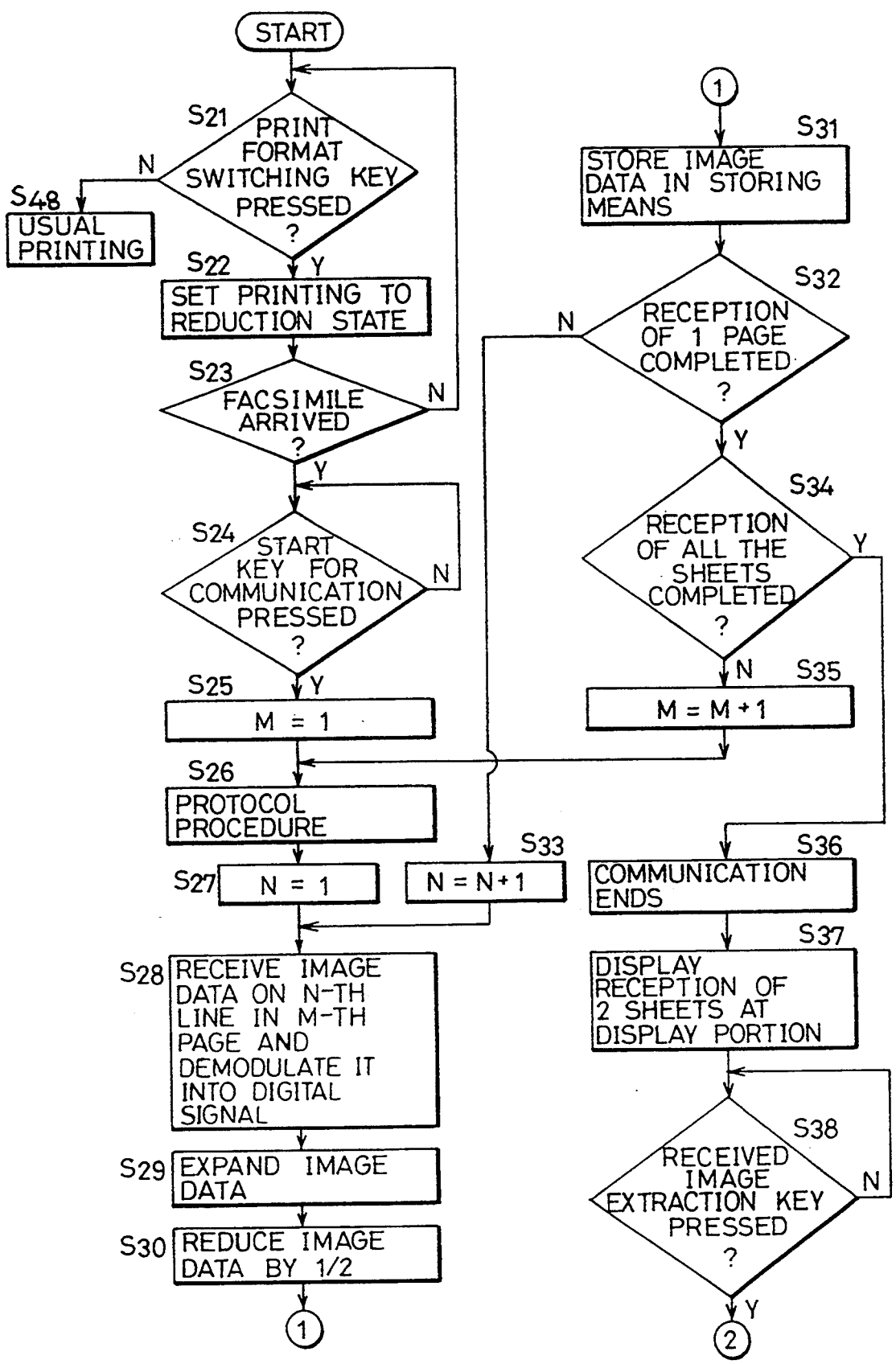
FIG. 7 is a part of a flow chart showing the content of control by a main control portion in accordance with the second embodiment of the invention.
Figure 8:
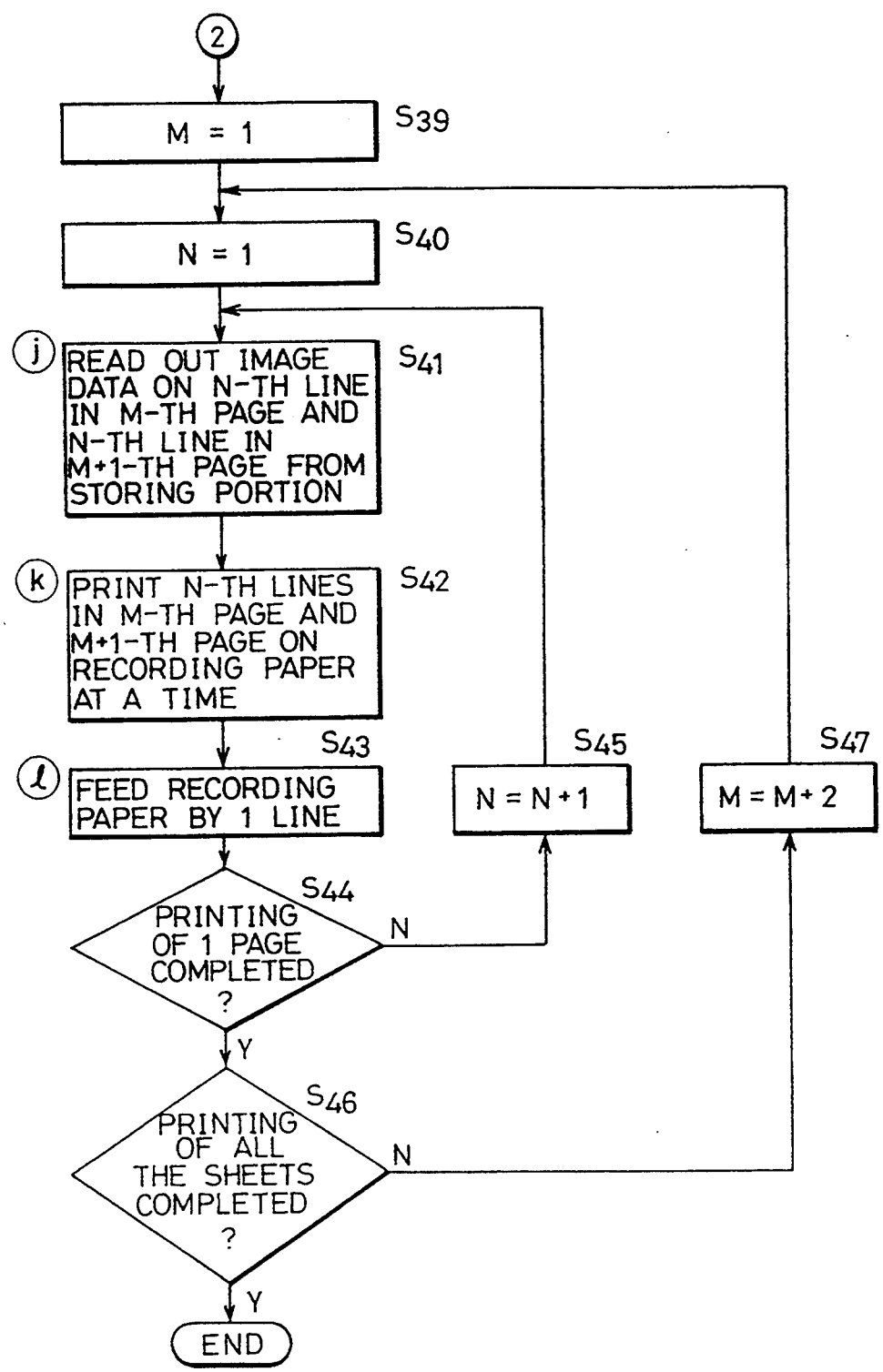
FIG. 8 is another part of the flow chart showing the content of control conducted by the main control portion in accordance with the second embodiment of the invention.

(1) An operation at the time of facsimile reception will be described in accordance with flow charts in FIGS. 7 and 8 by illustrating a reception of two sheets of original of B4 size as an example.

The reduction printing key of the key operation portion 3 is operated to select a reduction ratio of $\frac{1}{2}$ and the print format is switched (S21). The content of the key is taken into the main control portion 12 through the key control portion 4, and the main control portion 12 sets a reduction printing mode (S22).

In this state, in response to transmitting data from another party, a prescribed key of the key operation portion 3 is operated for conducting a facsimile communication (S23, S24). Then, the content of the key is taken into the main control portion 12 through the key control portion 4, and the flow enters a protocol procedure for initiating the facsimile communication (S25–S27).

After the protocol procedure is completed, when compressed image data of an analog signal for 1 line of the first page of original is transmitted from the other party, the data is received at the modem 1, and the image data of the analog signal is demodulated into image data of a digital signal (S28).

Then, the compressed image data is expanded by the facsimile machine control portion 2, and returned to the original image data. The resultant image data is transferred to the reduction processing portion 11 by the image data transfer control portion and reduced by $\frac{1}{2}$ (S29, S30).

The image data after the reduction is transferred to the storing portion 13 by the image data transfer control portion 10, and stored therein (S31).

Thereafter, by repeating the procedure from S28 to S33, the content of the second line, . . . the content of the Nth line, . . . and so on are sequentially read and reduced, and finally image data for the first page of the original is stored in the storing portion 13. The image data for the first page is stored as shown in FIG. 9(a) sequentially from the head in the order of the image data for the first line, the image data for the second line, . . . , the image data for the Nth line, . . . An EOL (End Of Line) data signed is interposed between the image data of the Nth line and the image data of the N+1 line so that the end of the page can be detected.

In S32, when completion of reception of the first page is detected, via S34 and S35, a protocol procedure before receiving the second page is conducted with the other party S26 and, by repeating the procedure from S27 to S33, the second page of the original is read out, reduced by $\frac{1}{2}$ and stored in the storing portion 13 sequentially from the first line. Consequently, the content of the storing portion 13 will be as shown in FIG. 9(b).

When completion of reception of all the sheets of original are detected, the telephone line is disconnected, thus completing the communication (S34, S36). Then, the main control portion 12 displays at the display portion 15 through the display control portion 14 that the two sheets of original of B4 size have been received (S37).

Then, when an instruction of printing out is given by a key operation of the key operation portion 3, the main control portion 12 takes in the content through the key control portion 4, and moves onto a reading processing of image data from the storing portion 13 (S38–S40).

The image data transfer control portion 10, as shown in FIG. 10, reads out the image data of the first line of the first page and the image data of the first line of the second page from the storing portion 13 and transfers these pieces of data to the printing control portion 8 through the copy control portion 9. The first lines of both pages are printed out at a time on a sheet of recording paper by the printing portion 7, and the recording paper is fed to a printing position for the next 1 line (S41–S43).

Figure 11:
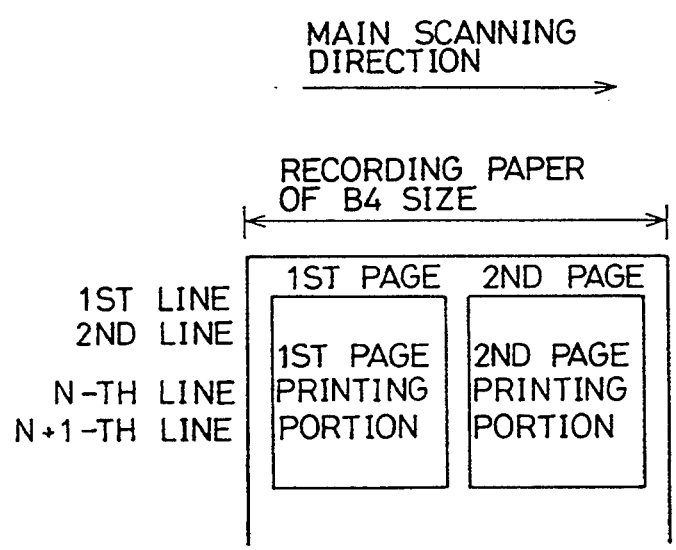
FIG. 11 is an illustration of how data is printed out onto recording paper in accordance with the second embodiment of the invention.

Then, the image data transfer control portion 10 determines that printing of 1 page is not complete, moves onto reading of the image data of the second line of the first page and the image data of the second line of the second page (S44, S45, S41). Thereafter, by repeating the procedure from S41 to S45, the image data of the first page and the image data of the second page are arranged in the main scanning direction on the sheet of recording paper, and still can be printed out at a time, so that the same printing result as shown in FIG. 11 can be provided. If the number of lines in the first page and the number of lines in the second page are not identical, the blank image data of the page with the smaller number of lines may be processed as an empty space.

Then, when completion of printing of one page is detected and completion of printing of all the sheets is detected, the operation ends (S46, S47).

(2) An operation in copying will be described by illustrating the case in which two sheets of original of B4 size are reduced by ½ and copied.

The reduction printing key of the key operation portion 3 is operated to select a reduction ratio of ½, and the print format is switched. The content of the key is taken into the main control portion 12 through the key control portion 4, and the main control portion 12 sets a reduction print mode.

Then, by operating a copy key at the key operation portion, the content of the key is taken into the main control portion 12 through the key control portion 4, and the main control portion 12 sets a copy mode, controls the respective portions based on a program for copying, and a copying operation is executed as follows.

The reading control portion 6 operates the paper feeding mechanism of the reading portion 6, and feeds the original to a reading position for reading the first line of the first page of original, causes the reading portion 5 to read the image, and converts the read image into image data. The image data is transferred to the reduction processing portion 11 through the copy control portion 9 by the function of the image data transfer control portion 10 and reduced by ½ therein.

The image data after the reduction is transferred to the storing portion 13 by the image data transfer control portion 10 and stored therein.

In the same procedure as described above, the content of the second line, . . . , the content of the Nth line, . . . are sequentially read, and reduced, and finally the image data of the first page of the original is stored in the storing portion 13. The second page of original is sequentially read from the first line, reduced by ½ and then stored in the storing portion 13.

After the reading of the second page of the original is completed, the image data transfer control portion 10 detects the completion and initiates reading of the image data. The operation thereafter is the same as that after S39 at the time of facsimile reception as described above, that is, reading and printing of the image data are conducted, providing a printing result as shown in FIG. 11.

Also in this embodiment, as with the foregoing first embodiment, when two sheets or three sheets of original of B4 size are dealt with, printing is conducted onto a sheet of recording paper as shown in FIGS. 4(a) and (b), respectively, and selection of a reduction ratio can provide printing as shown in FIGS. 5(a) and (b).

Thus in the second embodiment, image data on a plurality of original sheets can be printed out side by side in the main scanning direction on a sheet of recording paper, which makes it possible to keep data more compactly in a reduced volume, the amount of recording paper consumed can be reduced, and a reduction of time required for printing can be expected by simultaneously printing out image data of a plurality of original sheets. Furthermore, since image data after reduction is stored in the storing portion, and, the storing portion can more efficiently be used as compared to the case of storing image data after expansion. In addition, it is not necessary to provide the paper feeding mechanism of the printing portion with the function of rewinding. If the storing portion has space to spare, image data after expansion may be stored instead of image data after reduction.

Third Embodiment

In this embodiment, transmitted and compressed image data is stored in a storing portion, the image data read out from the storage portion is expanded, reduced and then printed out on a sheet of recording paper. Referring to a block diagram in FIG. 6, an operation will be described in conjunction with flow charts in FIGS. 12 and 13.

An operation at the time of facsimile reception will be described illustrating reception of two sheets of original B4.

Figure 12:
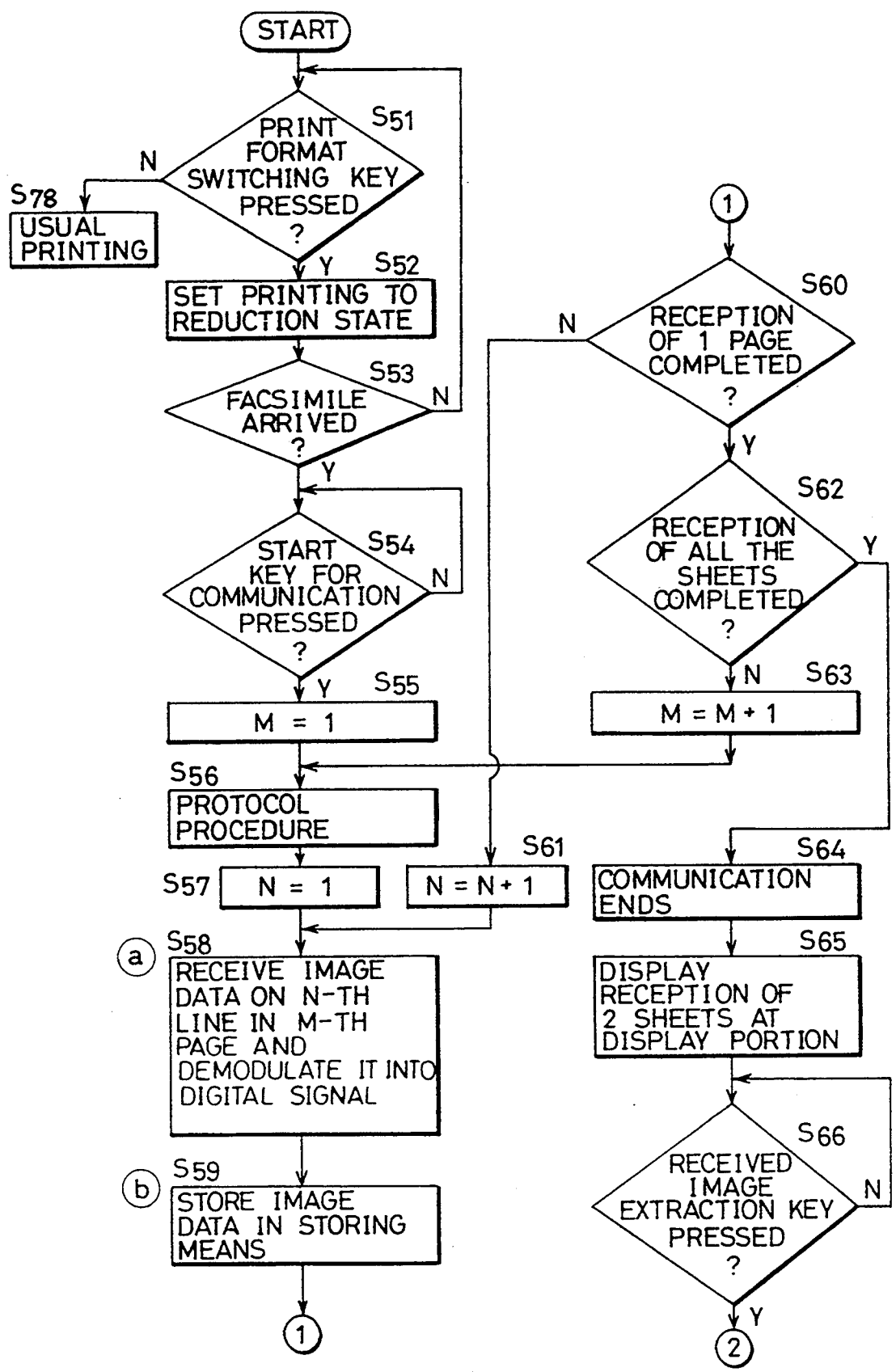
FIG. 12 is a part of a flow chart showing the content of control made by a main control portion in accordance with the third embodiment of the invention.
Figure 13:
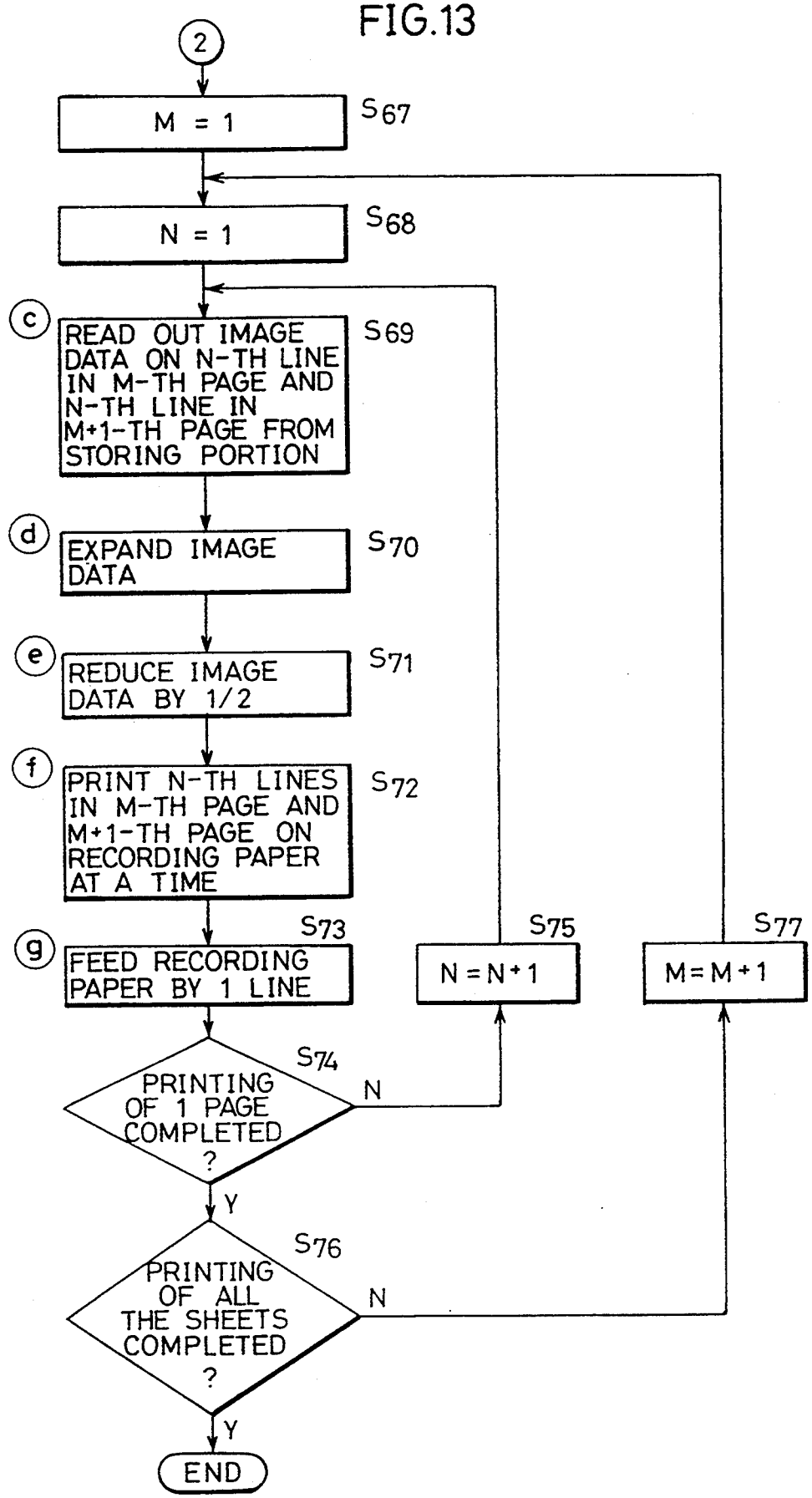
FIG. 13 is another part of a flow chart showing the content of control made by the main control portion in accordance with the third embodiment of the invention.
Figure 14:
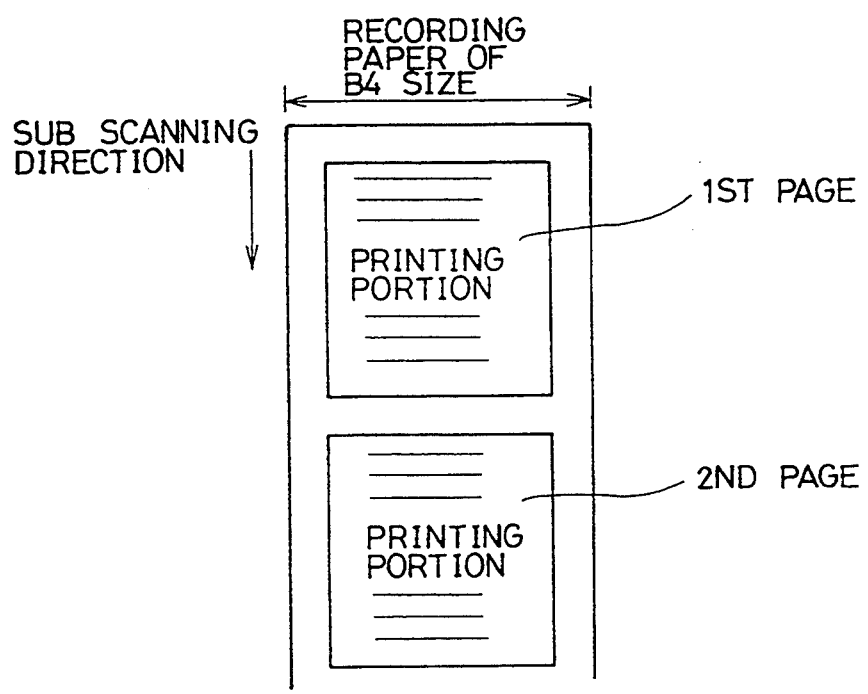
FIG. 14 is a representation showing how data is printed out onto recording paper in a conventional facsimile machine.

In FIG. 12, the procedure from S51 to S58 is the same as that from S21 to S28 in the second embodiment, and the description will not be repeated here.

In S58, image data compressed into a digital signal from image data of an analog signal after the reception is stored into the storing portion 13 through a facsimile control portion 2 by the function of an image data transfer control portion 10 (S59). Then, a determination whether or not reception of one page is completed is conducted (S60), thereafter the procedure from S58 to S61 is repeated, the content of the second line, . . . , the content of the Nth line, . . . are sequentially received, demodulated, and finally compressed image data of the first page of original is stored in the storing portion 13.

In S60, upon detecting a completion of reception of one page, a determination whether or not reception of all the sheets is completed is made (S62). If not completed through S63, a protocol procedure before receiving the second page is conducted with the other party (S56), and through S57, by repeating a procedure from S58 to S61, the second page of original will sequentially be received from its first line, demodulated, and then stored in the storage portion 13.

When completion of reception of all the sheets is detected, the telephone line is disconnected, thus ending the communication (S62, S64). Then, the main control portion 12 displays at the display portion 15 through the display control portion 14 that the two sheets of original of B4 size have been received (S65).

Then, an instruction of printing out is given by a key operation of the key operation portion 3, the main control portion 12 takes the content through the key control portion 4 and moves onto a reading processing of image data from the storing portion 13 (S66-S68).

The image data transfer control portion 10 reads out the image data of the first line of the first page and the image data of the first line of the second page from the storing portion 13, expands the image data compressed at the facsimile control portion 2 thereby returning the data into the original image data, and reduces the image data returned to the original by ½ at the reduction processing portion 11 (S69-S71). Then, the reduced image data is transferred to the printing control portion 8 through the copy control portion 9, the image data of the first lines of both pages are printed out at a time on a sheet of recording paper by the printing portion 7, and the sheet of recording paper is fed to a printing position for the next 1 line (S72, S73).

Then, the image data transfer control portion 10 determines that printing of one page is not completed (S74), and moves onto a reading processing of the image data of the second line of the first page and the image data of the second line of the second page (S75, S69). Thereafter, by repeating the procedure from S69 to S75, the image data of the first page and the image data of the second page are sequentially arranged in the main scanning direction on the sheet of recording paper and simultaneously printed out, resulting in a printing result as shown in FIG. 11.

Then, when completion of printing of one page is detected and then completion of printing of all the sheets is detected, the operation ends (S76, S77).

Thus, also in the third embodiment, image data of a plurality of original sheets can be printed out at a time side by side in the main scanning direction on a sheet of recording paper. This makes it possible to more compactly keep data in a reduced volume, to reduce the amount of recording paper consumed to reduce the time required for printing by simultaneous printing image data of a plurality of original sheets, and the recording portion can more efficiently be used as compared to the second embodiment because the compressed image data is stored in the storing portion. In addition, this embodiment provides the other benefits given by the second embodiment.

The facsimile machines described above are of the manual reception type (wherein a facsimile communication mode is set by a manual key operation when data comes in from another party), but the invention is not limited to facsimile machines of this type, and can be applied to facsimile machines of the automatic reception type.

In the second and third embodiments, after image data on all the original sheets is stored in the storing portion, printing may automatically be initiated.

Although the present invention has been described and illustrated in detail, it is clearly understood that the same is by way of illustration and example only. Thus such details are not to be taken by way of limitation; rather spirit and scope of the present invention is to be limited only by the terms of the appended claims.

What is claimed is:

1. A facsimile machine, comprising:
reception means for receiving image data corresponding to a plurality of sheets of an original;
instruction means for giving an instruction of printing in a reduction printing mode;
reduction means responsive to the instruction output of said instruction means for reducing said received image data;
storing means for storing the image data reduced by said reduction means;
printing means for printing, on a sheet of recording paper fed in a first direction, image data on a line-by-line basis in a second direction intersecting said first direction; and
control means for controlling said printing means to print out an image corresponding to at least two sheets of said original among said plurality of sheets of original side-by-side in said second direction on said sheet of recording paper, based on said reduced image data, said control means causing the image data of the same line of each page to be printed side-by-side in the second direction before printing the next line of each page side-by-side.

2. A facsimile machine as recited in claim 1, further comprising:

storing means for storing said reduced image data; and
extraction means for sequentially extracting from said stored image data the respective image data of a corresponding pair of lines of image data of images to be printed out side-by-side in said first direction, said control means controlling said printing means to print out based on said extracted image data.

3. A facsimile machine as recited in claim 1, further comprising:
expansion means for expanding said received image data;
storing means for storing said expanded image data; and
extraction means for sequentially extracting from said stored image data, the respective image data of a corresponding pair of lines of images to be printed out side-by-side in said second direction,
said reduction means reducing said extracted image data.

4. A facsimile machine as recited in claim 3, further comprising display means for displaying the number of originals corresponding to received image data.

5. A facsimile machine, comprising:
selection means for selecting a reduction printing mode;
reduction means for reducing image data transmitted from another party when said reduction printing mode is selected;
storing means for storing the image data reduced by said reduction means;
printing means for printing the image data reduced by said reduction means on a sheet of recording paper; and
control means for controlling said printing means to print out image data for prescribed sheets of original side-by-side in a main scanning direction when said printing means prints out image data for a plurality of sheets of original in said reduction mode, said control means causing the image data of the same line of each page to be printed side-by-side in the second direction before printing the next line of each page side-by-side.

6. A facsimile machine comprising:
selection means for selecting a reduction printing mode;
reduction means for reducing image data transmitted from another party when said reduction printing mode is selected;
storing means for storing the image data reduced by said reduction means;
printing means for printing image data read out from said storing means onto a sheet of recording paper; and
control means for controlling said printing means to print out image data for prescribed, different sheets of an original side-by-side in a main scanning direction when said printing means prints out image data for a plurality of sheets of original in said reduction printing mode, said control means causing the image data of the same line of each page to be printed side-by-side in the second direction before printing the next line of each page side-by-side.

7. A facsimile machine as recited in claim 6, wherein said control means control means said printing means to sequentially read out from said storing means and print out the respective image data of a corresponding pair of lines of pages to be printed out side-by-side in said main scanning direction.

8. A facsimile machine comprising:

selection means for selecting a reduction printing mode;

storing means for storing compressed image data transmitted from another party when said reduction printing mode is selected;

data expansion means for expanding said stored image data read out from said storing means;

reduction means for reducing the image data expanded by said data expansion means;

storing means for storing the image data reduced by said reduction means;

printing means for printing out the image data reduced by said reduction means; and control means for controlling said printing means to print out image data for prescribed sheets of an original side-by-side in a main scanning direction, said control means causing the image data of the same line of each page to be printed side-by-side in the second direction before printing the next line of each page side-by-side.

9. A facsimile machine as recited in claim 8, wherein said control means controls said printing means to sequentially read out from said storing means the respective image data of a corresponding pair of lines of pages to be printed out side-by-side in said main scanning direction and prints out the read data.

* * * * *